(12) United States Patent
Ramanarayanan et al.

(10) Patent No.: US 10,176,365 B1
(45) Date of Patent: Jan. 8, 2019

(54) SYSTEMS AND METHODS FOR MULTI-MODAL PERFORMANCE SCORING USING TIME-SERIES FEATURES

(71) Applicant: Educational Testing Service, Princeton, NJ (US)

(72) Inventors: Vikram Ramanarayanan, San Francisco, CA (US); Lei Chen, Lawrenceville, NJ (US); Chee Wee Leong, Levittown, PA (US); Gary Feng, Princeton, NJ (US); David Suendermann-Oeft, San Francisco, CA (US)

(73) Assignee: Educational Testing Service, Princeton, NJ (US)

( * ) Notice: Subject to any disclaimer, the term of this patent is extended or adjusted under 35 U.S.C. 154(b) by 10 days.

(21) Appl. No.: 15/133,640

(22) Filed: Apr. 20, 2016

Related U.S. Application Data

(60) Provisional application No. 62/150,368, filed on Apr. 21, 2015, provisional application No. 62/169,752, filed on Jun. 2, 2015.

(51) Int. Cl.
*G06K 9/00* (2006.01)
*G06T 7/20* (2017.01)
(Continued)

(52) U.S. Cl.
CPC .......... *G06K 9/00335* (2013.01); *G06F 3/16* (2013.01); *G06K 9/00315* (2013.01);
(Continued)

(58) Field of Classification Search
CPC ... G06F 3/16; G06T 7/20; G06T 2207/10021; G06T 2207/10028; G06T 2207/20081;
(Continued)

(56) References Cited

U.S. PATENT DOCUMENTS

| 8,189,905 B2 * | 5/2012 | Eaton | G06K 9/00335 |
| | | | 382/107 |
| 8,358,834 B2 * | 1/2013 | Cobb | G06K 9/00771 |
| | | | 382/155 |

(Continued)

OTHER PUBLICATIONS

Chen et al. "Using multimodal cues to analyze mla'14 oral presentation quality corpus: Presentation delivery and slides quality." Proceedings of the 2014 ACM workshop on Multimodal Learning Analytics Workshop and Grand Challenge. ACM, 2014.*

(Continued)

*Primary Examiner* — Katrina Fujita
(74) *Attorney, Agent, or Firm* — Jones Day

(57) ABSTRACT

Computer-implemented systems and methods for evaluating a performance are provided. Motion of a user in a performance is detected using a motion capture device. Data collected by the motion capture device is processed with a processing system to identify occurrences of first and second types of actions by the user. The data collected by the motion capture device is processed with the processing system to determine values indicative of amounts of time between the occurrences. A non-verbal feature of the performance is determined based on the identified occurrences and the values. A score for the performance is generated using the processing system by applying a computer scoring model to the non-verbal feature.

17 Claims, 10 Drawing Sheets

(51) Int. Cl.
G06F 3/16 (2006.01)
G06K 9/62 (2006.01)
G06K 9/46 (2006.01)

(52) U.S. Cl.
CPC ..... G06K 9/00362 (2013.01); G06K 9/00604 (2013.01); G06K 9/46 (2013.01); G06K 9/6218 (2013.01); G06K 9/6256 (2013.01); G06T 7/20 (2013.01); G06T 2207/10021 (2013.01); G06T 2207/10028 (2013.01); G06T 2207/20081 (2013.01)

(58) Field of Classification Search
CPC ........... G06K 9/00315; G06K 9/00335; G06K 9/00362; G06K 9/00604; G06K 9/46; G06K 9/6218; G06K 9/6256
See application file for complete search history.

(56) References Cited

U.S. PATENT DOCUMENTS

| | | | |
|---|---|---|---|
| 9,336,268 B1 * | 5/2016 | Moudy | G06F 17/30412 |
| 9,946,354 B2 * | 4/2018 | Livshits | G06F 3/017 |
| 2004/0056907 A1 * | 3/2004 | Sharma | G06K 9/00335 715/863 |
| 2005/0283752 A1 * | 12/2005 | Fruchter | G06F 17/3079 717/100 |
| 2006/0028429 A1 * | 2/2006 | Kanevsky | G06F 3/017 345/156 |
| 2013/0108994 A1 * | 5/2013 | Srinivasa | G09B 21/009 434/156 |
| 2014/0095402 A1 * | 4/2014 | Merrill | G06Q 10/1053 705/321 |
| 2014/0132505 A1 * | 5/2014 | Vennelakanti | G06F 3/017 345/156 |
| 2014/0295400 A1 | 10/2014 | Zapata-Rivera et al. | |
| 2014/0302469 A1 | 10/2014 | Chen et al. | |
| 2015/0269529 A1 * | 9/2015 | Kyllonen | G06Q 10/1053 705/321 |
| 2015/0269857 A1 * | 9/2015 | Feng | G09B 7/00 434/353 |

OTHER PUBLICATIONS

Grafsgaard et al. "Predicting learning and affect from multimodal data streams in task-oriented tutorial dialogue." Educational Data Mining 2014. 2014.*
Miller et al. "Structural and temporal inference search (STIS): pattern identification in multimodal data." Proceedings of the 14th ACM international conference on Multimodal interaction. ACM, 2012.*
Nguyen et al. "Multimodal analysis of body communication cues in employment interviews." Proceedings of the 15th ACM on International conference on multimodal interaction. ACM, 2013.*
Boersma, Paul, Weenink, David; Praat, a System for Doing Phonetics by Computer; Institute of Phonetic Sciences, University of Amsterdam; Technical Report 132; 1996.
Cabral, Joao, Campbell, Nick, Ganesh, Shree, Gilmartin, Emer; Haider, Fashih, Kenny, Eamonn, Kheirkhah, Mina, Murphy, Andrew, Chiarain, Neasa, Pellegrini, Thomas, Orozko, Odei; Milla: Multimodal Interactive Language Learning Agent; ENTERFACE 2014; 2014.
Chang, Chih-Chung, Lin, Chih-Jen; LIBSVM: A Library for Support Vector Machines; ACM Transactions on Intelligent Systems and Technology, 2(3); Apr. 2011.
Chen, Lei, Yoon, Su-Youn; Application of Structural Events Detected on ASR Outputs for Automated Speaking Assessment; Proceedings of INTERSPEECH; 2012.
Chen, Lei, Tetreault, Joel, Xi, Xiaoming; Towards Using Structural Events to Assess Non-Native Speech; Proceedings of the NAACL HLT 2010 Fifth Workshop on Innovative Use of NLP for Building Educational Applications; pp. 74-79; 2010.

Chen, Lei, Zechner, Klaus; Applying Rhythm Features to Automatically Assess Non-Native Speech; Proceedings of Interspeech; 2011.
Chen, Lei, Zechner, Klaus, Xi, Xiaoming; Improved Pronunciation Features for Construct-Driven Assessment of Non-Native Spontaneous Speech; Proceedings of the North American Chapter of the ACL, Human Language Technologies; pp. 442-449; 2009.
Chen, Lei, Feng, Gary, Joe, Jilliam, Leong, Chee Wee, Kitchen, Christopher, Lee, Chong Min; Towards Automated Assessment of Public Speaking Skills Using Multimodal Cues; Proceedings of the 16th International Conference on Multimodal Interaction; pp. 200-203; 2014.
Higgins, Derrick; Xi, Xiaoming, Zechner, Klaus, Williamson, David; A Three-Stage Approach to the Automated Scoring of Spontaneous Spoken Responses; Computer Speech and Language, 25; pp. 282-306; 2011.
Kapoor, Ashish, Picard, Rosalind; Multimodal Affect Recognition in Learning Environments; Proceedings of the 13th Annual ACM International Conference on Multimedia; pp. 677-682; 2005.
Lamere, Paul, Kwok, Philip, Gouvea, Evandro, Raj, Bhiksha, Singh, Rita, Walker, William, Warmuth, Manfred, Wolf, Peter; The CMU SPHINX-4 Speech Recognition System; Proceedings of the ICASSP; Hong Kong, China; 2003.
Mehrez, Tarek, Abdelkawy, Abdelrahman, Heikal, Youmna, Lange, Patrick, Nabil, Hadeer, Suendermann-Oeft, David; Who Discovered the Electron Neutrino? A Telephony-Based Distributed Open-Source Standard-Compliant Spoken Dialog System for Question Answering; Proceedings of the GSCL; Darmstadt, German; 2013.
Naim, Iftekhar, Tanveer, M. Iftekhar, Gildea, Daniel, Hoque, Mohammed; Automated Prediction and Analysis of Job Interview Performance: The Role of What You Say and How You Say It; Automatic Face and Gesture Recognition; 2015.
Nguyen, Laurent Son, Frauendorfer, Denise, Schmid Mast, Marianne, Gatica-Perez, Daniel; Hire Me: Computational Inference of Hirability in Employment Interviews Based on Nonverbal Behavior; IEEE Transactions on Multimedia, 16(4); pp. 1018-1031; Jun. 2014.
Pianesi, Fabio, Mana, Nadia, Cappelletti, Alessandro, Lepri, Bruno, Zancanaro, Massimo; Multimodal Recognition of Personality Traits in Social Interactions; Proceedings of the 10th International Conference on Multimodal Interfaces; pp. 53-60; 2008.
Ramanarayanan, Vikram, Van Segbroeck, Maarten, Narayanan, Shrikanth; Directly Data-Derived Articulatory Gesture-Like Representations Retain Discriminatory Information About Phone Categories; Computer Speech and Language; in press; Mar. 2015.
Sanchez-Cortes, Diarazalia, Biel, Joan-Isaac, Kumano, Shiro, Yamato, Junji, Otsuka, Kazuhiro, Gatica-Perez, Daniel; Inferring Mood in Ubiquitous Conversational Video; Proceedings of the 12th International Conference on Mobile and Ubiquitous Multimedia; 2013.
Schroder, Marc, Trouvain, Jurgen; The German Text-to-Speech Synthesis System MARY: A Tool for Research, Development and Teaching; International Journal of Speech Technology, 6(4); pp. 365-377; 2003.
Schuller, Bjorn, Steidl, Stefan, Batliner, Anton, Schiel, Florian, Krajewski, Jarek; The INTERSPEECH 2011 Speaker State Challenge; Proceedings of INTERSPEECH 2011, 12th Annual Conference of the International Speech Communication Association; pp. 3201-3204; 2011.
Schuller, Bjorn, Steidl, Stefan, Batliner, Anton, Noth, Elmar, Vinciarelli, Alessandro, Burkhardt, Felix, van Son, Rob, Weninger, Felix, Eyben, Florian, Bocklet, Tobias, Mohammadi, Gelareh, Weiss, Benjamin; The INTERSPEECH 2012 Speaker Trait Challenge; Annual Conference of the International Speech communication Association; 2012.
Suendermann-Oeft, David, Ramanarayanan, Vikram, Techenbrock, Moritz, Neutatz, Felix, Schmidt, Dennis; Halef: An Open-Source Standard-Compliant Telephony-Based Modular Spoken Dialog System—A Review and an Outlook; International Workshop on Spoken Dialog Systems (IWSDS); Busan, South Korea; 2015.
Taylor, Paul, Black, Alan, Caley, Richard; The Architecture of the Festival Speech Synthesis System; Proceedings of the ESCA Workshop on Speech Synthesis; Jenolan Caves, Australia; 1998.
Van Meggelen, Jim, Madsen, Leif, Smith, Jared; Asterisk: The Future of Telephony; Sebastopol, CA: O'Reilly Media; 2007.

(56) References Cited

OTHER PUBLICATIONS

Van Segbroeck, Maarten, Van Hamme, Hugo; Unsupervised Learning of Time-Frequency Patches as a Noise-Robust Representation of Speech; Speech Communication, 51(11); pp. 1124-1138; 2009.

Witt, Silke; Use of Speech Recognition in Computer-Assisted Language Learning; Unpublished Dissertation, Cambridge University Engineering Department; Cambridge, UK; 1999.

Yuan, Jiahong, Liberman, Mark; Speaker Identification on the SCOTUS Corpus; Journal of the Acoustical Society of America, 123(5); pp. 3878-3881; 2008.

Zechner, Klaus, Higgings, Derrick, Xi, Xiaoming, Williamson, David; Automatic Scoring of Non-Native Spontaneous Speech in Tests of Spoken English; Speech Communication, 51(10); pp. 883-895; 2009.

Barsade, Sigal; The Ripple Effect: Emotional Contagion and Its Influence on Group Behavior; Administrative Science Quarterly, 47(4); pp. 644-675; Dec. 2002.

Bazaldua, Diego Luna, Khan, Saad, Von Davier, Alina, Hao, Jiangang, Liu, Lei, Wang, Zuowei; On Convergence of Cognitive and Noncognitive Behvaior in Collaborative Activity; Proceedings of the 8th International Conference on Educational Data Mining; pp. 496-499; 2015.

Bilakhia, Sanjay, Petridis, Stavros, Pantic, Maja; Audiovisual Detection of Behavioural Mimicry; IEEE Humaine Association Conference on Affective Computing and Intelligent Interaction; pp. 123-128; 2013.

Ekman, Paul, Rosenberg, Erika; What the Face Reveals: Basic and Applied Studies of Spontaneous Expression Using the Facial Action Coding System (FACS); Oxford University Press: New York, NY; 1997.

Jucks, Regina, Becker, Bettina-Maria, Bromme, Rainer; Lexical Entrainment in Written Discourse: Is Experts' Word Use Adapted to the Addressee?; Discourse Processes, 45(6); pp. 497-518; Nov. 2008.

Lakin, Jessica, Jefferis, Valerie, Cheng, Clara; Chartrand, Tanya; The Chameleon Effect as Social Glue: Evidence for the Evolutionary Significance of Nonconscious Mimicry; Journal of Nonverbal Behavior, 27(3); pp. 145-162; Fall 2003.

Levitan, Rivka, Gravano, Agustin, Willson, Laura, Benus, Stefan, Hirschberg, Julia, Nenkova, Ani; Acoustic-Prosodic Entrainment and Social Behavior; Proceedings of the North American Chapter of the Association for Computational Linguistics: Human Language Technologies; pp. 11-19; Jun. 2012.

Littlewort, Gwen, Whitehill, Jacob, Wu, Tingfan, Fasel, Ian, Frank, Mark, Movellan, Javier, Bartlett, Marian; The Computer Expression Recognition Toolbox (CERT); IEEE International Conference on Automatic Face & Gesture Recognition; pp. 298-305; 2011.

Liu, Lei, Hao, Jiangang, Von Davier, Alina, Kyllonen, Patrick, Zapata-Rivera, Diego; A Tough Nut to Crack: Measuring Collaborative Problem Solving; Ch. 13 in Handbook of Research on Technology Tools for Real-World Skill Development; p. 344-359; 2015.

Pardo, Jennifer; On Phonetic Convergence During Conversational Interaction; Journal of the Acoustical Society of America, 119(4); pp. 2382-2393; Apr. 2006.

Ramanarayanan, Vikram, Leong, Chee Wee, Chen, Lei, Feng, Gary, Suendermann-Oeft, David; Evaluating Speech, Face, Emotion and Body Movement Time-Series Features for Automated Multimodal Presentation Scoring; Proceedings of the ACM International Conference on Multimodal Interaction; pp. 23-30; Nov. 2015.

Ramanarayanan, Vikram, Van Segbroeck, Maarten, Narayanan, Shrikanth; Directly Data-Derived Articulatory Gesture-Like Representations Retain Discriminatory Information About Phone Categories; Computer Speech and Language, 36; pp. 330-346; Mar. 2016.

Tawfik, Andrew, Sanchez, Lenny, Saparova, Dinara; The Effects of Case Libraries in Supporting Collaborative Problem-Solving in an Online Learning Environment; Technology, Knowledge and Learning, 19(3); pp. 337-358; Oct. 2014.

Thomason, Jesse, Nguyen, Huy, Litman, Diane; Prosodic Entrainment and Tutoring Dialogue Success; in Artificial Intelligence in Education, AIED 2013; Springer: Berlin; pp. 750-753; 2013.

Van Hamme, Hugo; HAC-models: A Novel Approach to Continuous Speech Recognition; Interspeech; pp. 2554-2557; Sep. 2008.

Zapata-Rivera, Diego, Jackson, Tanner, Liu, Lei, Bertling, Maria, Vezzu, Margaret, Katz, Irvin; Assessing Science Inquiry Skills Using Trialogues; Intelligent Tutoring Systems; 8474; pp. 625-626; 2014.

Xu, Yushi, Seneff, Stephanie; A Generic Framework for Building Dialogue Games for Language Learning: Application in the Flight Domain; Proceedings of SLATE; 2011.

Ehsani, Farzad, Bernstein, Jared, Najmi, Amir; An interactive Dialog System for Learning Japanese; Speech communication, 30(2-3); pp. 167-177; Feb. 2000.

Jeon, Je Hun, Yoon, Su-Youn; Acoustic Feature-Based Non-Scorable Response Detection for an Automated Speaking Proficiency Assessment; Proceedings 13th Annual Conference of the International Speech Communication Association, INTERSPEECH; Portland, OR; Sep. 2012.

Prylipko, Dmytro, Schnelle-Walka, Dirk, Lord, Spencer, Wendemuth, Andreas; Zanzibar OpenIVR: An Open-Source Framework for Development of Spoken Dialog Systems; Proceedings of the 14th International Conference on Text, Speech and Dialog, 6836; Pilsen, Czech Republic; pp. 372-379; Sep. 2011.

Ranganath, Rajesh, Jurafsky, Dan, McFarland, Daniel; Detecting Friendly, Flirtatious, Awkward, and Assertive Speech in Speed-Dates; Computer Speech & Language, 27(1); pp. 89-115; Jan. 2013.

Schnelle-Walka, Dirk, Radomski, Stefan, Muhlhauser, Max; JVoiceXML as a Modality Component in the W3C Multimodal Architecture; Journal on Multimodal User Interfaces, 7(3); pp. 183-194; Nov. 2013.

Schreiber, Lisa, Paul, Gregory, Shibley, Lisa; The Development and Test of the Public Speaking Competence Rubric; Communication Education, 61(3); pp. 205-233; 2012.

Suendermann, David, Liscombe, Jackson, Pieraccini, Roberto, Evanini, Keelan; How Am I Doing?: A New Framework to Effectively Measure the Performance of Automated Customer Care Contact Centers; Advances in Speech Recognition; pp. 155-179; Aug. 2010.

Van Hamme, Hugo; HAC-models: A Novel Approach to Continuous Speech Recognition; In INTERSPEECH, 9th Annual Conference of the International Speech Communication Association; Brisbane, Australia; pp. 2554-2557; Sep. 2008.

\* cited by examiner

SYSTEMS AND METHODS FOR MULTI-MODAL PERFORMANCE SCORING USING TIME-SERIES FEATURES

CROSS-REFERENCE TO RELATED APPLICATIONS

The present application claims priority to U.S. Provisional Application Ser. No. 62/150,368, entitled "Using Multimodal Dialog Technology for Assessment of Teachers' Classroom Interactions," filed Apr. 21, 2015, and to U.S. Provisional Application Ser. No. 62/169,752, entitled "Using Multimodal Dialog Technology for Assessment of Teachers' Classroom Interactions," filed Jun. 2, 2015, which are incorporated herein by reference in their entireties.

FIELD

This disclosure is related generally to performance evaluation and more particularly to performance evaluation using non-verbal features.

BACKGROUND

While limited-choice selection items have historically been used for evaluating abilities of a person, the amount of insight into those abilities that can be gained through the use of such testing items is limited. Such evaluation items have been used in large part due to the ease in scoring those item types. Given an ability to ease the scoring burden of more advanced item types, such advanced item types will be used more frequently, providing enhanced information on abilities of an examinee. For example, when investigating an examinee's communication ability (e.g., in evaluating progress in language learning, in evaluating teaching ability, in evaluating job aptitude as part of an interview process) it may be desirable to analyze the examinee's presentation abilities with some automatic scoring of those abilities being provided.

SUMMARY

Systems and methods for computer-implemented evaluation of a performance are provided. In a computer-implemented method of evaluating a performance, motion of a user in a performance by the user is detected using a motion capture device. Data collected by the motion capture device is processed with a processing system to identify occurrences of first and second types of actions by the user. The data collected by the motion capture device is processed with the processing system to determine values indicative of amounts of time between the occurrences. A non-verbal feature of the performance is determined based on the identified occurrences and the values. A score for the performance is generated using the processing system by applying a computer scoring model to the non-verbal feature.

As another example, a computer-implemented system for evaluating a performance includes a motion capture device configured to detect motion of a user in a performance by the user. The system also includes a processing system configured to process data collected by the motion capture device to identify occurrences of first and second types of actions by the user. The processing system is also configured to process the data collected by the motion capture device to determine values indicative of amounts of time between the occurrences. A non-verbal feature of the performance is determined based on the identified occurrences and the values. A score for the performance is generated using the processing system by applying a computer scoring model to the non-verbal feature.

As a further example, a non-transitory computer-readable storage medium for evaluating a performance is provided. The computer-readable storage medium comprises computer executable instructions which, when executed, cause a processing system to execute steps. In executing the steps, data collected by a motion capture device is processed to identify occurrences of first and second types of actions by a user, the motion capture device being configured to detect motion of the user in a performance by the user. The data collected by the motion capture device is processed to determine values indicative of amounts of time between the occurrences. A non-verbal feature of the performance is determined based on the identified occurrences and the values. A score for the performance is generated by applying a computer scoring model to the non-verbal feature.

DETAILED DESCRIPTION

Figure 1:
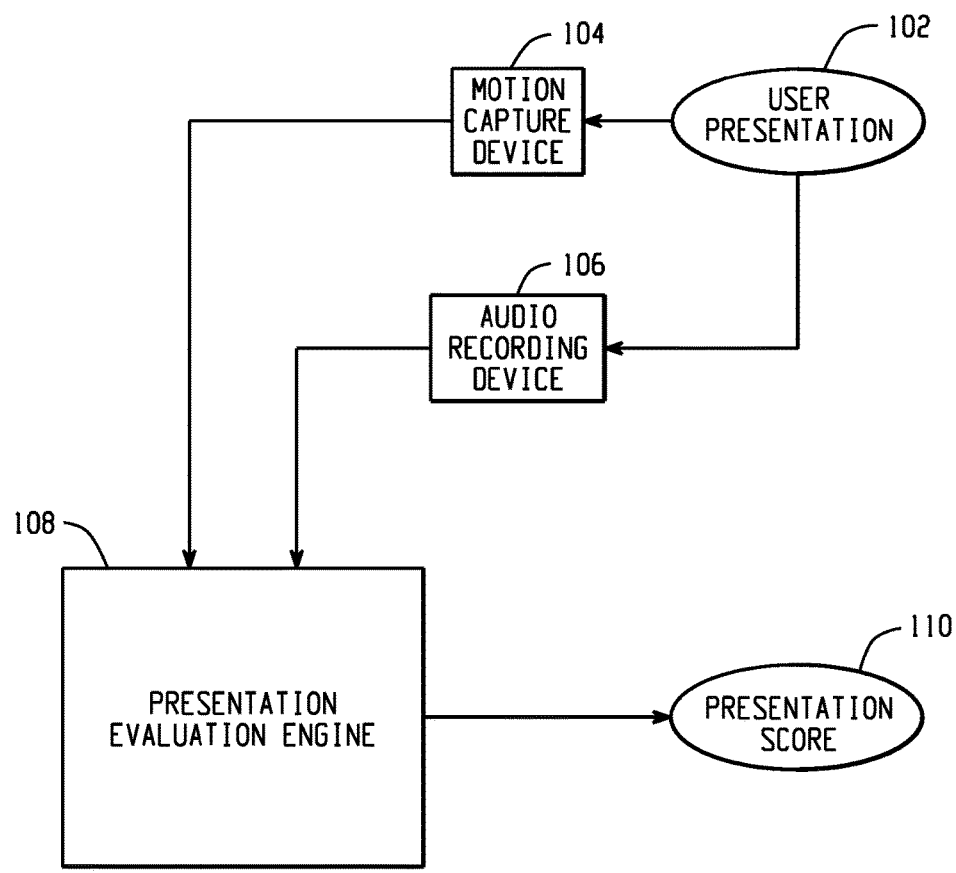
FIG. 1 is a block diagram depicting a presentation evaluation engine for providing a multi-modal evaluation of a presentation.

Presentations have long been used not only as a mechanism for conveying information but as a mechanism for measuring abilities of a person giving the presentation. For example, presentations are often required as part of a schooling program (e.g., an oral book report) to measure the user's substantive and/or presentation abilities. Such evaluations can be useful in many other circumstances as well. For example, as part of a teaching certification process, student-teachers are often asked to present a short lecture on a topic with little preparation time. In another example, students in an English-as-a-Second-Language program may be asked to speak on a topic to evaluate their communicative abilities in the English language. In a further example, communication skills during an interview are examined, especially for jobs, such as public relations positions, that require strong communication abilities.

Such presentation examinations have traditionally been human-scored (e.g., by an evaluator watching the presentation live). Such scoring is time consuming and expensive, but human presentation evaluations have been consistently used because of the level of information that they are able to provide about user abilities. Systems and methods are described herein for providing an automated, multi-modal evaluation of presentations that can enable more widespread use of presentation evaluations without significant increase in costs and other difficulties encountered in manual-scored presentation evaluations (e.g., bias of scorers). For example, such automatic scores could be utilized as a partial first round filter of interviewees for a job position having a large number of applicants.

In examples, the systems and methods described herein generate an automatic score for a presentation by extracting time-series features of the presentation, with the time-series features being based on data collected by a motion capture device. The time-series features encapsulate information about the temporal evolution of the user's motions and other non-verbal characteristics over the duration of the presentation. For instance, in an example, the time-series features take into account the temporal evolution of the user's body posture and facial features (e.g., facial expressions) over the duration of the presentation. Such time-series features are in contrast to time-aggregated features that aggregate information across time. As described in further detail below, the time-series features are able to explicitly model temporal co-occurrence patterns of the user's motions and other non-verbal characteristics over the duration of the presentation. By contrast, time-aggregated features are unable to model such temporal co-occurrence patterns.

The time-series features described herein are also in contrast to various other features (e.g., amount, occurrence, and frequency of body movement, gestures, eye movement, head turning, etc.) that do not take into account time information. In examples described below, a time-series feature is based on histograms of co-occurrences that model how different motions and other non-verbal characteristics co-occur within different time lags of each other over the course of a user's presentation. Such histograms of co-occurrences are described in further detail below. The time-series features of the instant disclosure may be used in the context of computer-implemented systems and methods that provide automated, multi-modal scoring of presentations based on both (i) non-verbal features of the presentations that are based on data collected by a motion capture device, and (ii) audio features of the presentations that are based on data collected by an audio recording device.

FIG. 1 is a block diagram depicting a presentation evaluation engine for providing a multi-modal evaluation of a presentation. A user presentation 102 is viewed by a motion capture device 104 configured to detect motion of the user giving the presentation 102. As referred to herein, the term "presentation" encompasses various types of performances. The presentations referred to herein may include, for example, job interviews, presentations made as part of a performance-based assessment (e.g., a teacher licensure exam), oral reports, speeches, business presentations, and lectures, among others. An audio recording device 106 is configured to capture audio of the user giving the presentation. Outputs from the motion capture device 104 and the audio recording device 106 are provided to a presentation evaluation engine 108. Based on those outputs, the presentation evaluation engine 108 is configured to generate a presentation score 110.

Figure 2:
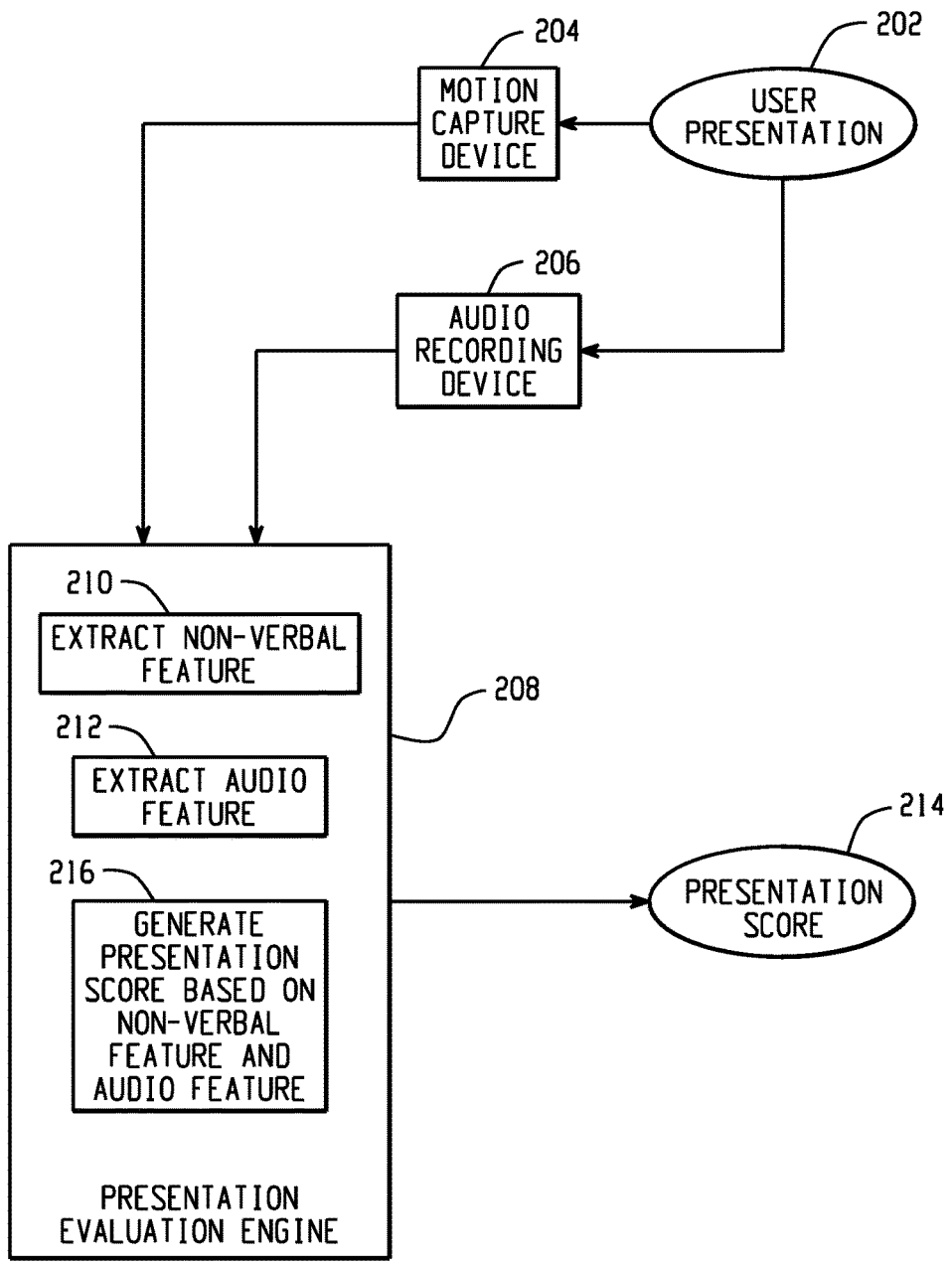
FIG. 2 is a block diagram depicting operations of a presentation evaluation engine.

FIG. 2 is a block diagram depicting operations of a presentation evaluation engine. Similar to the example of FIG. 1, a user presentation 202 is viewed by a motion capture device 204 configured to detect motion of the user giving the presentation 202. An audio recording device 206 is configured to capture audio of the user giving the presentation. Outputs from the motion capture device 204 and the audio recording device 206 are provided to a presentation evaluation engine 208. The presentation evaluation engine 208 includes one or more data processors that are configured to extract a non-verbal feature of the presentation 202 at 210 based on data collected by the motion capture device 204 and to extract an audio feature of the presentation at 212 based on data collected by the audio recording device 206. The presentation evaluation engine 208 is further configured to generate a presentation score 214 at 216 based on the non-verbal feature and the audio feature.

Figure 3A:
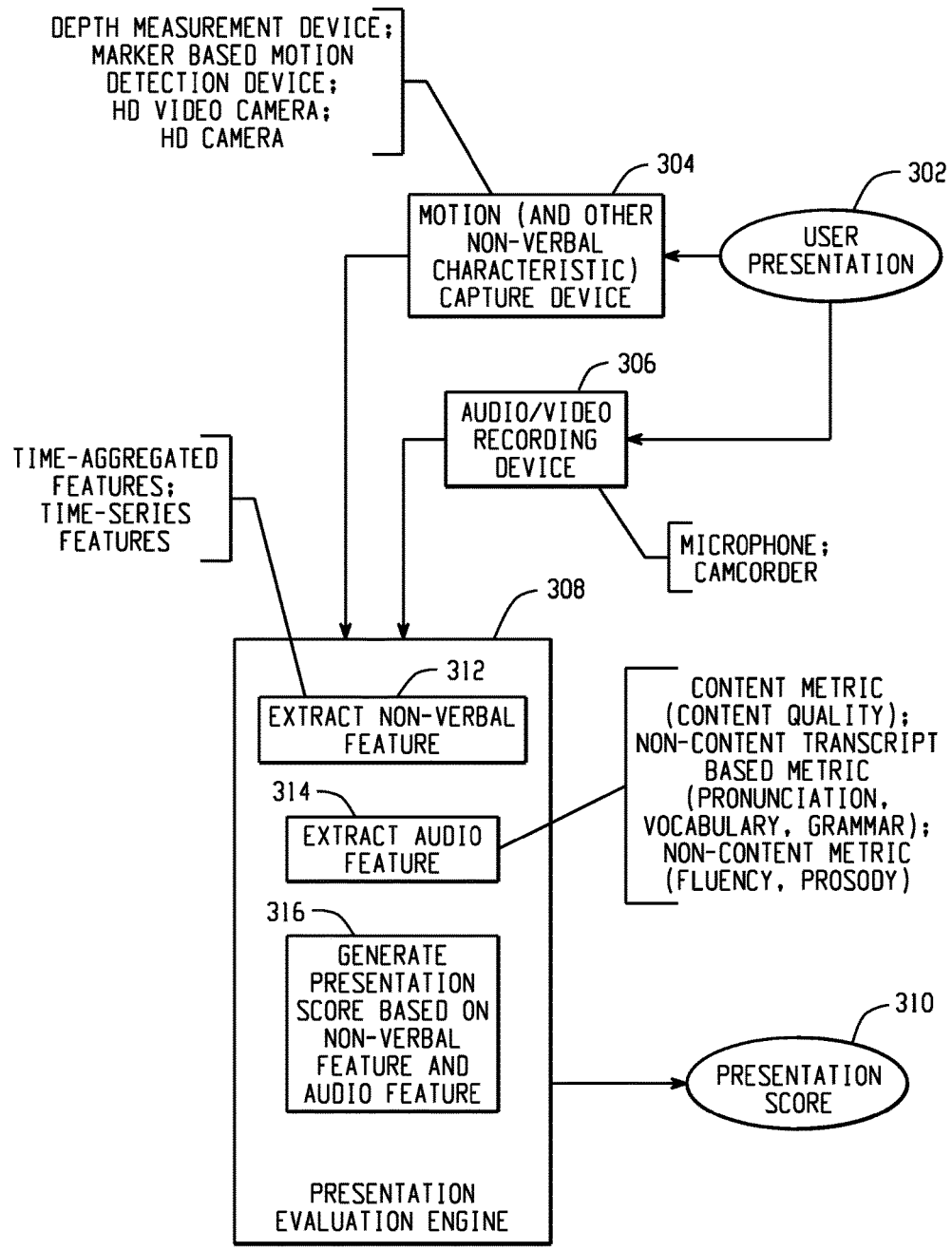
FIG. 3A is a block diagram depicting example components used in implementing a presentation evaluation engine.

FIG. 3A is a block diagram depicting example components used in implementing a presentation evaluation engine. Motion from a user presentation 302 is detected by a motion capture device 304 (e.g., digital values, voltages, video imagery). In one example, the motion capture device includes a depth measurement device (e.g., a Microsoft Kinect device, infrared sensor, etc.) that captures measurements of the distance of objects from a sensor (e.g., a digital depth measurement value for each pixel of an array of pixels) and thus, depth information that can be utilized to analyze motion of the user. In another example, the motion capture device 304 is a video camera (e.g., a high-definition video camera), where marker-based motion capture is performed based on anchor points identified at certain positions of the user. As those anchor points move from frame-to-frame of captured video, motion measurements can be measured. In another example, the video camera is utilized to measure facial expressions and changes in facial expressions throughout the presentation. An audio recording device 306, which may include a microphone, is configured to capture audio of the user presentation 308 for downstream processing. In one example, the audio of the user presentation 302 is captured using a microphone of a device, such as a camcorder, that is also acting as the motion capture device, as illustrated at 306.

In one example, multimodal data of the user presentation 302 is collected using the following equipment and software tools: (a) Microsoft Kinect (Windows Version 1) for recording three-dimensional (3D) body motions, (b) Brekel Pro Body Kinect tracking software (v1.30 64 bit version) for recording 58 body joints' motion traces in the Biovision hierarchical data format (BVH), and (c) a JVC Everio GZHM35BUSD digital camcorder for audio/video recording. In examples, the camcorder is mounted together with the Kinect on a tripod. Both the Kinect and the camcorder are placed 1.83 meters away from the front of a speaking zone in which the user is to present, in examples. It is noted that this particular configuration of hardware and software is only an example, and that other motion capture devices, audio recording devices, and software tools are used in other examples.

Outputs of the motion capture device 304 and the audio recording device 306 are provided to a presentation evaluation engine 308 for processing and downstream generation of a presentation score 310. At 312, the presentation evaluation engine 308 extracts one or more non-verbal features that are used in the generation of the presentation score 310. In examples, the one or more non-verbal features include a time-series feature. To extract the time-series feature, the presentation evaluation engine 308 processes data collected by the motion capture device 304 to identify occurrences of multiple different types of actions by the user. For instance, the presentation evaluation engine 308 may process the data collected by the motion capture device 304 to identify occurrences of various (i) gestures made by the user during the presentation 302, (ii) postures of the user during the presentation 302, (iii) facial expressions of the user during the presentation 302, and (iv) eye gazes of the user during the presentation 302 (i.e., eye gazes of certain directions, eye gazes that are not directed toward the motion capture device 304, etc.).

The types of actions identified by the presentation evaluation engine 308 may further include combinations of different gestures, postures, facial expressions, and eye gazes (e.g., a type of action identified by the presentation evaluation engine 308 may be a "folded hands" gesture in combination with a "slumped" posture, etc.). In examples, the presentation evaluation engine 308 identifies one or more types of actions from a multitude of K possible actions, where the K actions are determined automatically by an automatic clustering algorithm. Such examples are explained in further detail below with reference to FIG. 5. In identifying occurrences of these types of actions, the presentation evaluation engine 308 may process the data generated by the motion capture device 304 in various ways. For example, depth measurements from the motion capture device 304 could be used to detect occurrences of various gestures (e.g., hand gestures) during the presentation 302. In another example, magnitudes of pixel value changes or rates of change of pixel value changes between frames of a video could indicate occurrences of various movements by the user. As another example, an occurrence of a non-verbal posture (or head position/orientation) could be identified based on analysis of video footage of the user presentation 302. For example, changes in relative distances among anchor points on the user during the presentation 302 could indicate slouching at certain portions of the presentation. As a further example, occurrences of eye contact and facial expression actions could be identified, such as through analysis of high-definition video taken during the presentation 302, which indicate demeanor of the presenter and appropriateness of eye contact. Occurrences of other non-verbal actions (e.g., combinations of gestures and postures, an action or facial expression indicating the user's mood, etc.) could also be extracted.

In examples, the presentation evaluation engine 308 processes the data collected by the motion capture device 304 to identify occurrences of types of actions by the user that are based on the user's head pose, eye gaze, and facial expressions. It is known that a successful presentation entails speaker engagement with the audience, which translates to head postures and eye gazes that are necessarily directed towards the audience. Thus, in examples, the presentation evaluation engine 308 identifies occurrences of actions that target these aspects of the presentation 302. Head postures are approximated using the rotation attribute (i.e., pitch, yaw, and roll) of the head through a head and face tracking engine (e.g., Visage's SDK FaceTrack1), in examples. The tracking is activated if and only if the detector has detected a face in a current frame, in examples. Additionally, in examples, gaze directions are approximated through the gazeDirectionGlobal attribute of the Visage tracker SDK, which tracks gaze directions taking into account both head pose and eye rotation. Note that, different from head rotation, gaze directions represent estimated "eyeball" directions regardless of head postures, and can potentially measure a speaker's level of engagement with the audience. Thus, in examples, the time evolution of basic head pose measurements (Cartesian X, Y, Z coordinates along with pitch, yaw, and roll) as well as gaze tracking information over the entire presentation 302 are used in computing the time-series feature.

Facial expressions from presenters also contribute to an effective presentation. Thus, in examples, the presentation evaluation engine 308 utilizes an emotion detection toolkit (e.g., Emotient's FACET SDK2) to analyze facial expressions. In examples, the emotion detection toolkit outputs the intensity (e.g., ranging from 0 to 1) and confidence values for seven primary emotions (i.e., anger, contempt, disgust, joy, fear, sadness, and surprise). The presentation evaluation engine 308 computes the time-series feature based on the time-evolution of the estimated intensities of the different emotional states for the presentation 302.

To extract the time-series feature, the presentation evaluation engine 308 also computes values indicative of amounts of time between the identified occurrences of the different types of actions. The presentation evaluation engine 308 computes such values by processing the data collected by the motion capture device 304. In examples, the values are durations of time. Thus, for (i) an occurrence of a type of action "A" (e.g., a "folded hands" body posture) at a first time 5:00 (minutes:seconds) of a presentation, and (ii) an occurrence of a type of action "B" (e.g., an "open stance" body posture) at a second time 5:30 of the presentation, the presentation evaluation engine 308 may compute an amount of time of 30 seconds between the occurrences.

In other examples, the values indicative of the amounts of time between the identified occurrences of the actions include numbers of frames. The motion capture device 304 is configured to collect data that includes a sequence of frames of video imagery. Thus, for (i) an occurrence of a type of action "A" occurring at a frame number "3" of the sequence of frames, and (ii) an occurrence of a type of action "B" occurring at a frame number "10" of the sequence of frames, the presentation evaluation engine 308 may compute a number of frames (i.e., 7 frames, in this example) between the occurrences. The number of frames is indicative of the amount of time between the occurrences of the types of actions A and B.

Figure 3B:
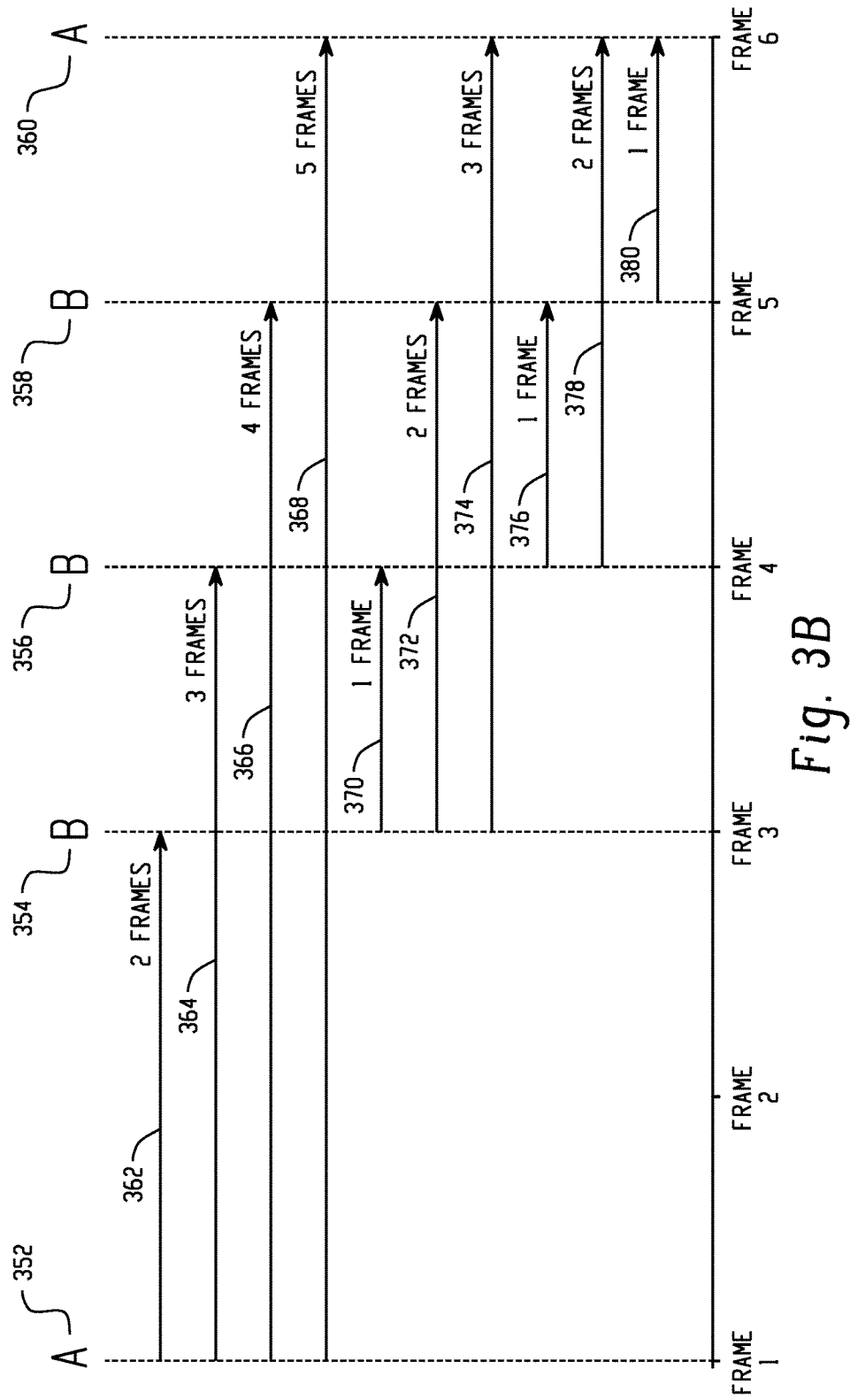
FIG. 3B illustrates example types of actions "A" and "B" and corresponding frame numbers in which the types of actions occur.

In examples, the presentation evaluation engine 308 computes the time-series feature of the user presentation 302 based on the identified occurrences of the different types of actions by the user and the values indicative of the amounts of time between the occurrences. To illustrate the computation of an example time-series feature, reference is made to FIGS. 3B and 3C. In FIG. 3B, the presentation evaluation engine 308 processes data collected by the motion capture device 304 to identify occurrences of types of actions "A" and "B" by the user during the presentation. Each of the types of actions may be, for instance, a particular gesture, posture, eye gaze, or facial expression, or a combination of one or more gestures, postures, eye gazes, and facial expressions (e.g., a type of action may be a slumped posture with an eye gaze directed at the user's feet, etc.). As illustrated in the example of FIG. 3B, the presentation evaluation engine 308 identifies occurrences of the type of action A at frame numbers 1 and 6 of the sequence of frames generated by the motion capture device 304. Occurrences of the type of action B are identified at frame numbers 3, 4, and 5 of the sequence of frames.

The presentation evaluation engine 308 further processes the data collected by the motion capture device 304 to determine numbers of frames between the identified occurrences. Thus, as illustrated in FIG. 3B, for an occurrence 352 of the type of action A at frame number 1 and an occurrence 354 of the type of action B at frame number 3, the presentation evaluation engine 308 determines a number of frames 362 (e.g., 2 frames) between the occurrences 352, 354. In examples, the presentation evaluation engine 308 computes the numbers of frames between each of the identified occurrences. In these examples, for a given occurrence of the type of action A or B, numbers of frames between the given occurrence and all other identified occurrences are computed. This is illustrated in FIG. 3B, which depicts numbers of frames 362-380 separating each of the identified occurrences 352-360.

Figure 3C:
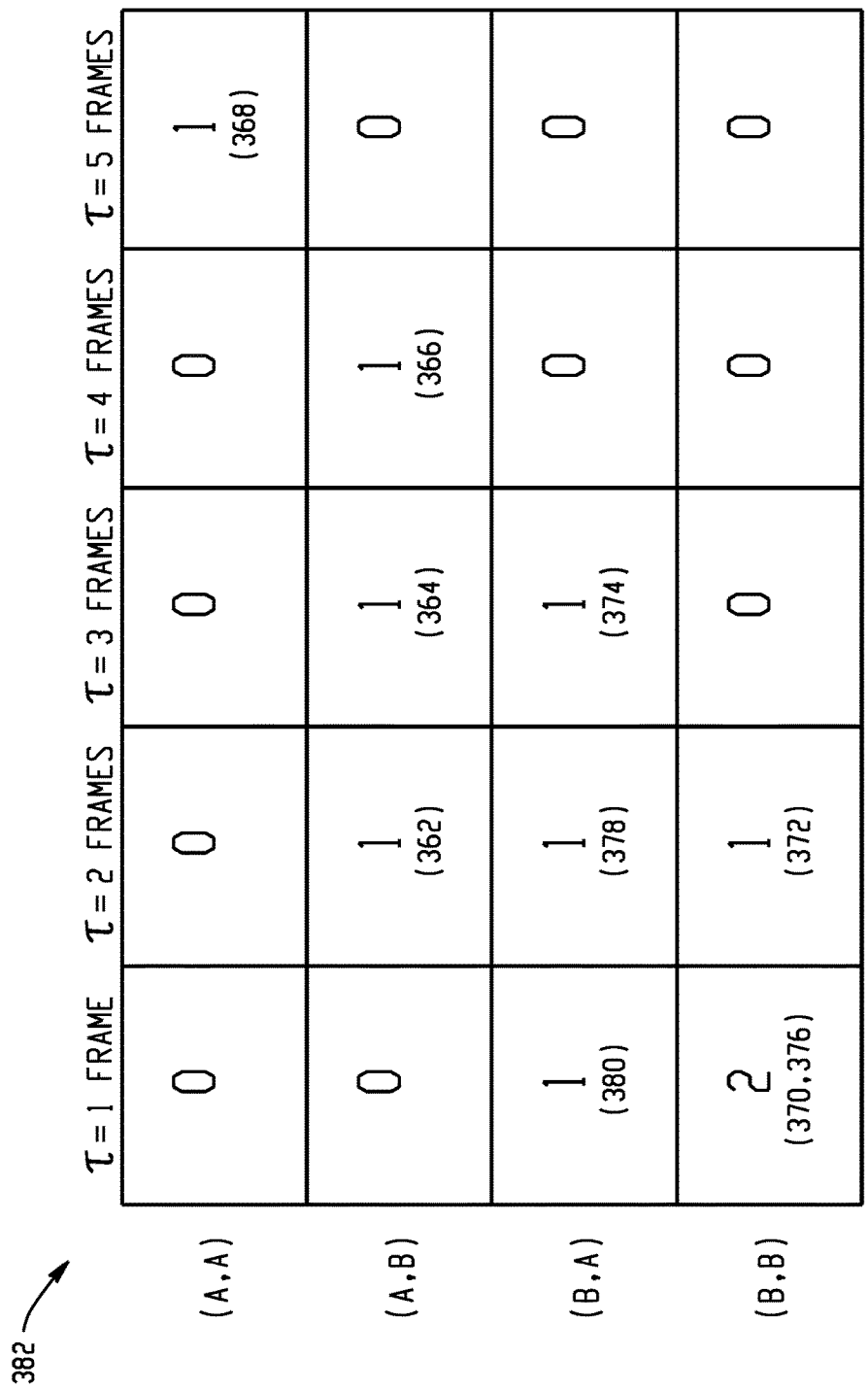
FIG. 3C depicts an example histograms of co-occurrence vector.

In the example of FIGS. 3B and 3C, the presentation evaluation engine 308 computes the time-series feature based on the identified occurrences 352-360 and the numbers of frames 362-380 separating the identified occurrences. Specifically, in the example of FIGS. 3B and 3C, for different numbers of frames $\tau$, the presentation evaluation engine 308 computes (1) a count of a number of times that an occurrence of the type of action A followed an occurrence of the type of action B, with the occurrences occurring $\tau$ frames apart, (2) a count of a number of times that an occurrence of the type of action B followed an occurrence of the type of action A, with the occurrences occurring $\tau$ frames apart, (3) a count of a number of times that an occurrence of the type of action A followed a different occurrence of the type of action A, with the occurrences occurring $\tau$ frames apart, and (4) a count of a number of times that an occurrence of the type of action B followed a different occurrence of the type of action B, with the occurrences occurring $\tau$ frames apart.

To illustrate such values (1)-(4) computed for the example of FIG. 3B, reference is made to FIG. 3C, which depicts a table 382. The rows of the table 382 correspond to pairs of types of actions, and the columns of the table 382 correspond to numbers of frames $\tau$ separating occurrences of the actions. For a row (m, n) and a column $\tau$, an entry of the table 382 indicates a count of a number of times that an occurrence of the type of action n followed an occurrence of the type of action m, with the occurrences occurring $\tau$ frames apart. For example, the row (A, B) includes counts of the number of times that an occurrence of the type of action B followed an occurrence of the type of action A for various values of $\tau$ frames separating the occurrences. In FIG. 3B, for instance, the occurrences 354, 356, 358 of the type of action B follow the occurrence 352 of the type of action A, with the occurrences being separated by respective numbers of frames 362, 364, 366 (i.e., respective numbers of frames $\tau$=2, 3, and 4). This data is captured in the table 382 of FIG. 3C, which depicts counts of "1" for the row (A, B) for $\tau$=2, 3, and 4.

Likewise, for example, the row (B, B) in FIG. 3C includes counts of the number of times that an occurrence of the type of action B followed a different occurrence of the type of action B for various values of $\tau$ frames separating the occurrences. In FIG. 3B, for instance, one frame 370 separates the occurrences 354, 356 of the type of action B, and one frame 376 separates the occurrences 356, 358 of the type of action B. This data is captured in the table 382 of FIG. 3C, which depicts a count of "2" in the row (B, B) for $\tau$=1. The data shown in the table of FIG. 3C captures all of the data for the identified occurrences 352-360 shown in FIG. 3B.

In examples, the time-series feature computed by the presentation evaluation engine 308 includes or is based on the various counts shown in the table 382 of FIG. 3C. Although the example of FIGS. 3B and 3C is based on only the two types of actions A and B, in other examples, the presentation evaluation engine 308 is configured to process the data collected by the motion capture device 304 to identify occurrences of more than two different types of actions by the user. In other examples, for instance, the presentation evaluation engine 308 is configured to identify occurrences of different types of actions A, B, and C by the user. In these other examples, a vector for storing counts of co-occurrences includes 9 rows (i.e., rows for pairs (A, A), (A, B), (A, C), (B, A), (B, B), (B, C), (C, A), (C, B), (C, C)), and the vector is populated by determining the amounts of time between the occurrences and counting the co-occurrences, as described above.

The time-series feature that is based on such counts may be referred to as a "histograms of co-occurrence" feature. As described above, the histograms of co-occurrence feature is based on counts of the number of times that different types of actions (e.g., body postures, gestures, facial expressions, eye gazes, etc.) co-occur with each other at different time lags (e.g., different values of $\tau$) over the course of the user presentation 302. The histograms of co-occurrence feature encapsulates information about the temporal evolution of the user's motions and other non-verbal characteristics over the duration of the presentation 302. Modeling of this temporal evolution in the histograms of co-occurrence feature may be advantageous because it takes into account the fact that the user's presentation competency may not be constant over the course of the presentation 302. For example, the user may get fatigued over time, or be more nervous at the beginning of the presentation 302 (e.g., thus resulting in repetitive, cyclic fidgeting behavior, etc.) and gradually settle into a comfort zone later. Conventional scoring approaches that aggregate information across time are not able to model this temporal evolution, in contrast to the systems and methods described herein. The systems and methods described herein may thus result in richer features than those used in the conventional, time-aggregated approaches.

The conventional scoring approaches are also not able to model temporal co-occurrence patterns. An example temporal co-occurrence pattern is, for example, a pattern of a certain prototypical body posture following another prototypical body posture during certain parts the user's presentation 302. Capturing such patterns may be useful in (i) explicitly understanding the predictive power of different features (such as the occurrence of a given emotion) in temporal context (such as how often did this emotional state occur given the previous occurrence of another emotional state), thus permitting (ii) obtaining features that are more interpretable. In contrast to the conventional approaches, the histograms of co-occurrence feature of the systems and methods described herein explicitly encapsulate information regarding temporal co-occurrence patterns. Thus, for example, the histograms of co-occurrence feature is able to model how often a certain prototypical body posture (e.g., folded hands) follows a second prototypical body posture (e.g., an open stance) in a pattern during different parts of the presentation 302.

With reference again to FIG. 3A, the one or more non-verbal features that are extracted at 312 further include time-aggregated features, in examples. In such examples, the time-aggregated features are extracted in addition to the above-described time-series features. In contrast to the time-series features, the time-aggregated features extracted at 312 aggregate information across time and do not encapsulate information about the temporal evolution of the user's motions and other non-verbal characteristics over the duration of the presentation 302. In examples, in computing the time-aggregated features, the presentation evaluation engine 308 computes statistical functionals of certain body point markers that have been determined to correlate well with human-rated scores of presentations and that capture the degree of locomotion and hand movement. A feature set of time-aggregated features may be extracted based on the statistical functional (e.g., the mean and standard deviation of the hip markers, hand movement markers, and their speeds, etc.).

The one or more non-verbal features extracted at 312 may include various other features, in some examples. For example, occurrence, frequency, and speed of body movement, gestures, eye movement, head turning, etc., can be determined by the presentation evaluation engine 308, such as from successive frames of captured video imagery using suitable image processing methods including conventional image processing methods and algorithms.

At 314, the presentation evaluation engine 308 extracts one or more audio features using data from the audio recording device 306. Audio features utilized by the presentation evaluation engine 308 may be content-based features or non-content-based features. For example, an audio feature may measure a quality of content spoken by the user in the presentation 302. In such an example, the presentation audio is provided to an automatic speech recognizer that generates a transcript of the presentation 302. To analyze the content of the presentation 302, the transcript can be compared to other model transcripts, compared to a prompt presented to the user to set up the presentation, or another constructed response scoring technique can be used, such as techniques that use natural language processing or latent semantic analysis to compare texts. Certain non-content based audio features can utilize a transcript (e.g., an automatic speech recognizer transcript or a manual transcript) to generate an audio feature. For example, an audio feature could measure pronunciation of words in the presentation 302 by comparing sounds produced by the presenter at certain points of the presentation, as captured by the audio recording device 306, and proper pronunciations of words identified at those points in the transcript. Other non-content transcript based metrics could indicate levels of vocabulary and grammar used in the presentation 302. Other non-content, delivery-type metrics can be determined without use of a transcript (although an automatic speech recognizer may still be used to generate the metrics). For example, fluency and prosody can be measured by observing stresses, accents, and discontinuities (e.g., pauses, hesitations, use of filler words, false starts, repetitions) in audio captured of the presentation 302.

In examples, the one or more audio features extracted at 314 cover measurements including lexical usage, fluency, pronunciation, prosody, grammar, audio quality, and so on. Further, in examples, the presentation evaluation engine 308 uses a speech rating system (e.g., the SpeechRater system known to those of ordinary skill in the art) that processes speech and an associated transcription to generate a series of features on multiple dimensions of speaking proficiency, e.g., speaking rate, prosodic variations, pausing profile, and pronunciation, which may be measured by Goodness of Pronunciation (GOP) or its derivatives. The SpeechRater system, which may be used by the presentation evaluation engine 308 in extracting the one or more audio features at 314, is described in detail in "Speechrater: A construct-driven approach to scoring spontaneous non-native speech," by Zechner et al., Proc. SLaTE (2007), and "Automated Scoring of Spontaneous Speech Using SpeechRater v1.0," by Xi et al. (Research Report, November 2008), which are incorporated herein by reference in their entireties.

One or more non-verbal features and/or one or more audio features can be combined to generate a presentation score 310 at 316. For example, the features 312, 314 can be weighted to generate the presentation score 310, where such weights can be generated through analysis of human scored presentations, where such analysis indicates correlations between features of presentations and human scores for those presentations. In examples, the presentation evaluation engine 308 automatically generates the score 310 by applying a computer scoring model (e.g., a statistical computer model) to the one or more non-verbal features and to the one or more audio features. The computer scoring model may comprise a portion of the presentation evaluation engine 308 for automatically scoring the presentation 302 without human intervention (or requiring only minimal human intervention). The generation of the computer scoring model is described in further detail below with reference to FIG. 4.

Figure 4:
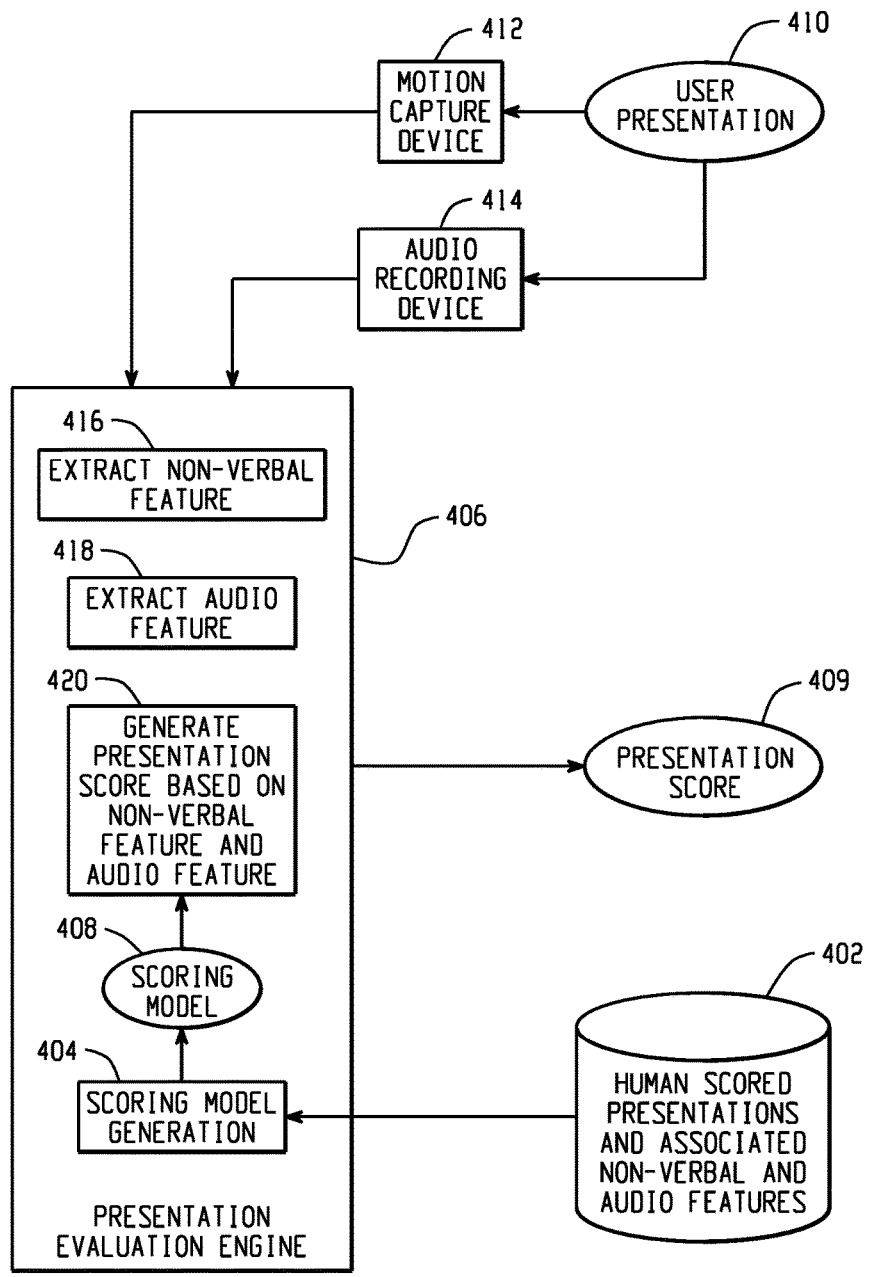
FIG. 4 is a block diagram depicting generation of a scoring model for use in generating presentation scores.

FIG. 4 is a block diagram depicting generation of a computer scoring model for use in generating presentation scores. A collection of human-scored presentations are assembled, such as in a computer-readable data store 402 that contains the human scores and a variety of different non-verbal and audio features of those presentations. In examples, humans score the presentations using the Public Speaking Competence Rubric (PSCR) known to those of ordinary skill in the art, as an assessment rubric. For example, human raters may score presentation videos along multiple scoring dimensions (e.g., 10 dimensions) that represent various aspects of presentation proficiency on a multiple-point scale (e.g., a five-point Likert scale from 0 to 4). The multiple scoring dimensions may be related to the presentation's introduction (e.g., whether user formulates an introduction that orients the audience to the topic and speaker), organization (e.g., whether user uses an effective organizational pattern), conclusion (e.g., whether user develops a conclusion that reinforces the thesis and provides closure), word choice (e.g., whether user demonstrates a careful choice of words), vocal expression (e.g., whether user effectively uses vocal expression and paralanguage to engage audience), nonverbal behavior (e.g., whether user demonstrates nonverbal behavior that reinforces the message), audience adaptation (e.g., whether user successfully adapts the presentation to the audience), visual aids (e.g., whether user makes skillful use of visual aids), and persuasion (e.g., whether user constructs an effectual persuasive message with credible evidence), along with a holistic metric (e.g., judging the presentation on a holistic basis).

A scoring model generation module 404 of a presentation evaluation engine 406 performs an analysis of the human-scored presentations to determine which non-verbal and audio features are predictive of human scores, in examples. For example, the scoring model generation module 404 may identify correlations between non-verbal and audio features and the assigned human score to select features that are predictive and weight those features accordingly. In an example, the weighting factors of the model may be determined via a machine learning application trained based on the human-scored presentations. Specifically, the machine learning application may utilize a linear regression analysis, a logistic regression analysis, or another type of algorithm or analysis (e.g., a random forest learning analysis, decision tree analysis, random tree analysis, Classification And Regression Tree (CART) analysis, etc.). In some examples, support vector machines (SVM) are used to perform regression experiments on the multiple scoring dimensions with leave-one-speaker-out cross-validation. Linear or radial basis function (RBF) kernels may be utilized.

The identified features (e.g., multiple non-verbal features and multiple audio features) and their associated weights are stored as a scoring model 408 that is utilized for generating presentation scores 409 for other user presentations 412. A user presentation 410 is viewed by a motion capture device 412 configured to detect motion of the user giving the presentation 410. An audio recording device 414 is configured to capture audio of the user giving the presentation. Outputs from the motion capture device 412 and the audio recording device 414 are provided to the presentation evaluation engine 406.

The presentation evaluation engine 406 includes one or more data processors that are configured to extract a non-verbal feature of the presentation 410 at 416 based on data collected by the motion capture device 412, such as the non-verbal features identified for use by the scoring model 408 because of the predictiveness of human scores. At 418, the presentation evaluation engine 406 extracts an audio feature of the presentation at 410 based on data collected by the audio recording device 414. The presentation evaluation engine 406 is configured to generate the presentation score 409 at 420 based on the non-verbal feature and the audio feature as instructed by the scoring model 408. In examples, the presentation score 409 is generated based on the time-series, histograms of co-occurrence feature described above, which models how different types of actions by the user (e.g., body postures, facial expressions, etc.) co-occur within different time lags of each other over the course of the user's presentation.

It is noted that under the approaches described herein, one or more computer-based models are used in determining the score 409. As described above, such computer-based models may be trained via a machine-learning application in order to determine weighting factors for the models. By contrast, conventional human scoring techniques for determining a score for a presentation include none of these steps. Conventional human scoring techniques involve one or more human raters viewing performances and manually assigning scores to the performances. Also, the conventional human techniques would not include use of the above-described time-series, histograms of co-occurrence feature. The use of the histograms of co-occurrence feature permits modeling of how different user actions (e.g., gestures, postures, eye gazes, facial expressions, etc.) co-occur within different time lags of each other in a particular time series. It would be difficult or impossible for a human to manually monitor user performances and detect and make note of the multitude of user actions that may occur over the course of the performances. Further, it would be difficult or impossible for the human to precisely record timing information for each user action. Additional distinctions between the approaches described herein and conventional human techniques are described throughout this disclosure. The approaches described herein are rooted in computer technology and are vastly different than conventional human techniques, as noted above. Accordingly, it is evident that the approaches described herein are not mere computer implementation of conventional human techniques and indeed are vastly different from such.

Figure 5:
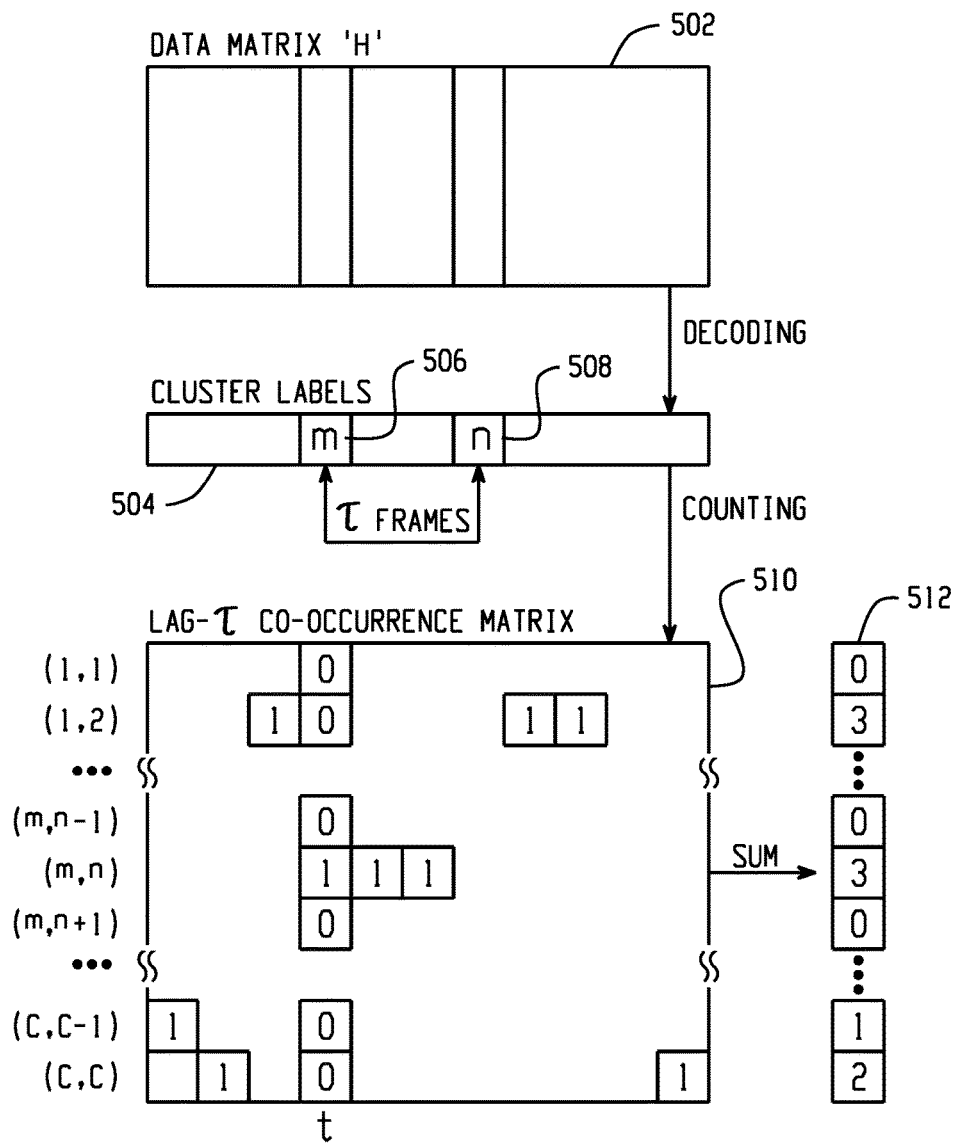
FIG. 5 is a schematic depiction of the computation of histograms of co-occurrences for a given presentation.

FIG. 5 is a schematic depiction of the computation of histograms of co-occurrences. Under the approaches of the instant disclosure, a time-series, histograms of co-occurrences (HoC) feature is computed for a user's presentation. The HoC feature can be applied to any multivariate time-series data. In examples, for instance, the HoC feature is computed for Kinect, Face/Gaze, and Emotion data streams described herein. The HoC feature comprises a single high-dimensional feature vector that is computed for the time series, in examples. The use of the HoC feature vector may be advantageous because it explicitly encapsulates information regarding temporal co-occurrence patterns. Thus, for example, this feature is capable of modeling how often a certain prototypical body posture (e.g., folded hands) follows another prototypical body posture (e.g., an open stance) in a definitive pattern during parts of the presentation.

As described above with reference to FIGS. 3A-3C, in computing the HoC feature, the number of times different prototypical body postures co-occur with each other at different time lags over the course of the time series are counted. Such prototypical body postures may include gestures, head postures, eye gazes, and facial expressions, as described herein, among other postures. In examples, cluster centroids derived from K-means clustering on the space of body postures in a training dataset are used as prototypical body postures that are analyzed. Different cluster sizes (e.g., 16, 32, 64, etc.) may be used.

After the clustering is performed to determine the body postures to be analyzed, each frame of data of an input time-series data matrix H is replaced with the best-matching cluster label. FIG. 5 depicts a data matrix H at 502 and corresponding cluster labels at 504. The cluster labels shown at 504 thus represent the data matrix H as a single-row vector of cluster labels. At 504, two frames of data from the data matrix H are shown as being replaced with cluster labels "m" and "n" at 506 and 508, respectively. In examples, the input time series data matrix H comprises frames of video imagery and/or other data captured from a motion capture device and associated software. In replacing each frame of data of the input time-series data matrix H with a best-matching cluster label, each frame is matched to one of the identified prototypical body postures. Thus, in FIG. 5, the label "m" may be associated with a body posture "folded hands," and the label "n" may be associated with a body posture "open stance," for instance. As can be seen from FIG. 5, these respective body postures are observed $\tau$ frames apart in the input data.

Continuing the example of FIG. 5, a HoC-representation of lag $\tau$ is then defined as a vector 510 where each entry corresponds to the number of times all pairs of cluster labels are observed $\tau$ frames apart. In other words, a vector of lag-$\tau$ co-occurrences 510 is constructed where each entry (m, n) signifies the number of times that the input sequence of activation frames is encoded into a cluster label m at time t (in the single-row vector shown at 504), while encoded into cluster label n at time (t+$\tau$). In the vector 510, different rows represent different pairs of cluster labels (e.g., different pairs of prototypical body gestures), and different columns represent different times t. Thus, for instance, entries of a row (1, 1) are representative of instances of an occurrence of a prototypical body posture "1" following another occurrence of the prototypical body posture "1," with the occurrences occurring $\tau$ frames apart. Likewise, for instance, entries of a row (1, 2) are representative of instances of an occurrence of a prototypical body posture "2" following an occurrence of the prototypical body posture "1," with the occurrences occurring $\tau$ frames apart. It is noted that a number of rows in the vector 510 is equal to $C^2$ (i.e., C*C), where C is the number of clusters (i.e., the number of different body postures analyzed in the input data).

By stacking all (m, n) combinations, each interval can be represented by a single column vector 512, where the elements of the column vector 512 express the sum of all $C^2$ possible lag-$\tau$ co-occurrences. The procedure is repeated for different values of $\tau$, with the results being stacked into one "supervector." An example of such a supervector is illustrated in FIG. 3C, which shows data for $\tau$=1, 2, 3, 4, 5 and two cluster labels A and B. The dimensionality of the HoC feature vector increases by a factor of $C^2$ for each lag value τ under consideration. In one example, four lag values of 1 to 10 frames (corresponding to 100-1000 ms) are utilized.

Figure 6:
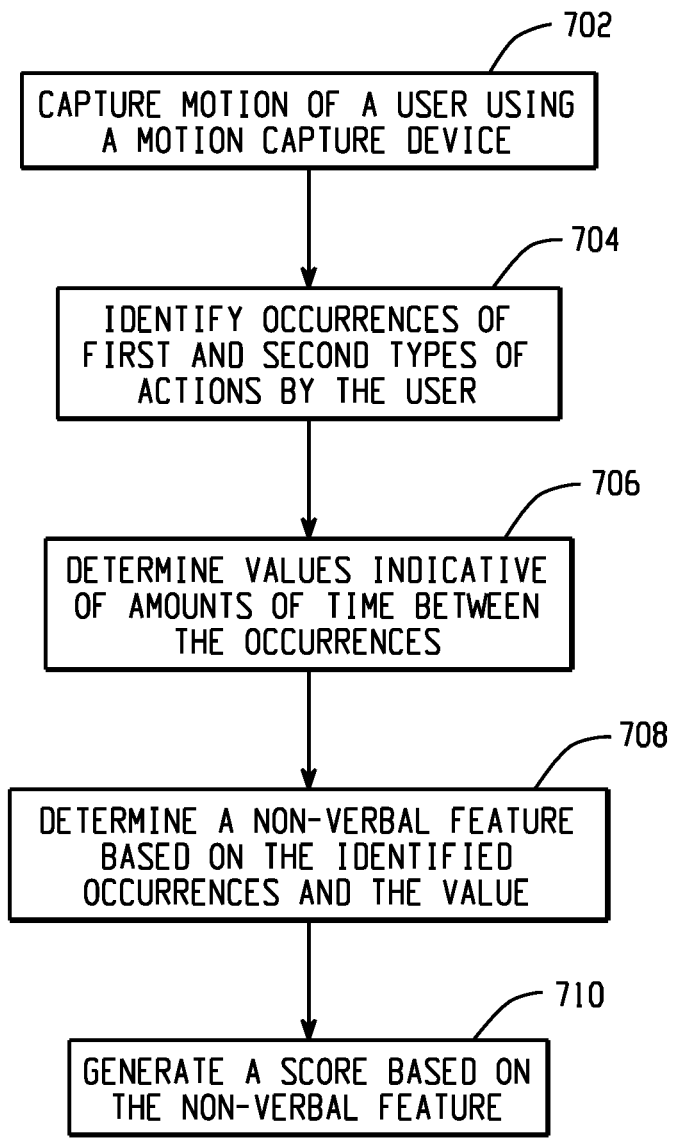
FIG. 6 is a flowchart depicting operations of an example computer-implemented method of evaluating a presentation.

FIG. 6 is a flowchart depicting operations of an example computer-implemented method of evaluating a presentation. At 702, motion of a user giving a presentation is detected using a motion capture device. At 704, data collected by the motion capture device is processed with a processing system to identify occurrences of first and second types of actions by the user. At 706, the data collected by the motion capture device is processed with the processing system to determine values indicative of amounts of time between the occurrences. At 708, a non-verbal feature of the presentation is determined based on the identified occurrences and the values. At 710, a score for the presentation is generated using the processing system by applying a computer scoring model to the non-verbal feature.

Figure 7A:
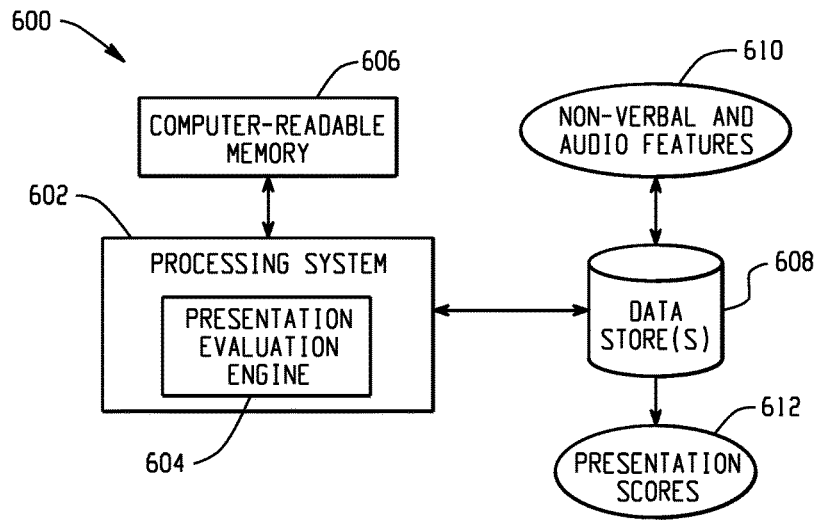
FIGS. 7A, 7B, and 7C depict example systems for use in implementing a presentation evaluation engine.
Figure 7B:
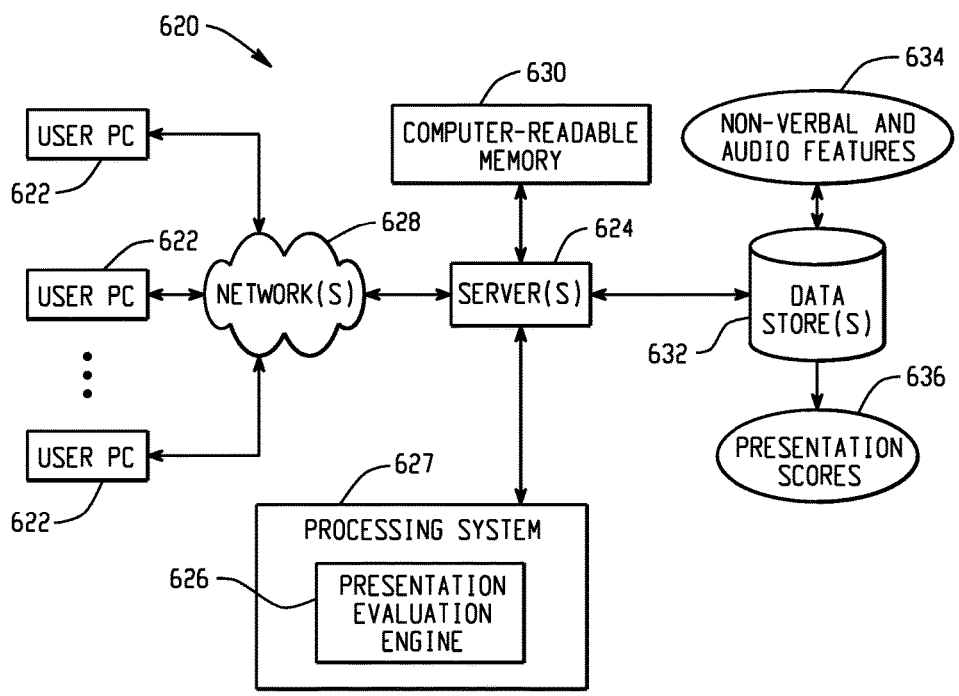
Figure 7C:
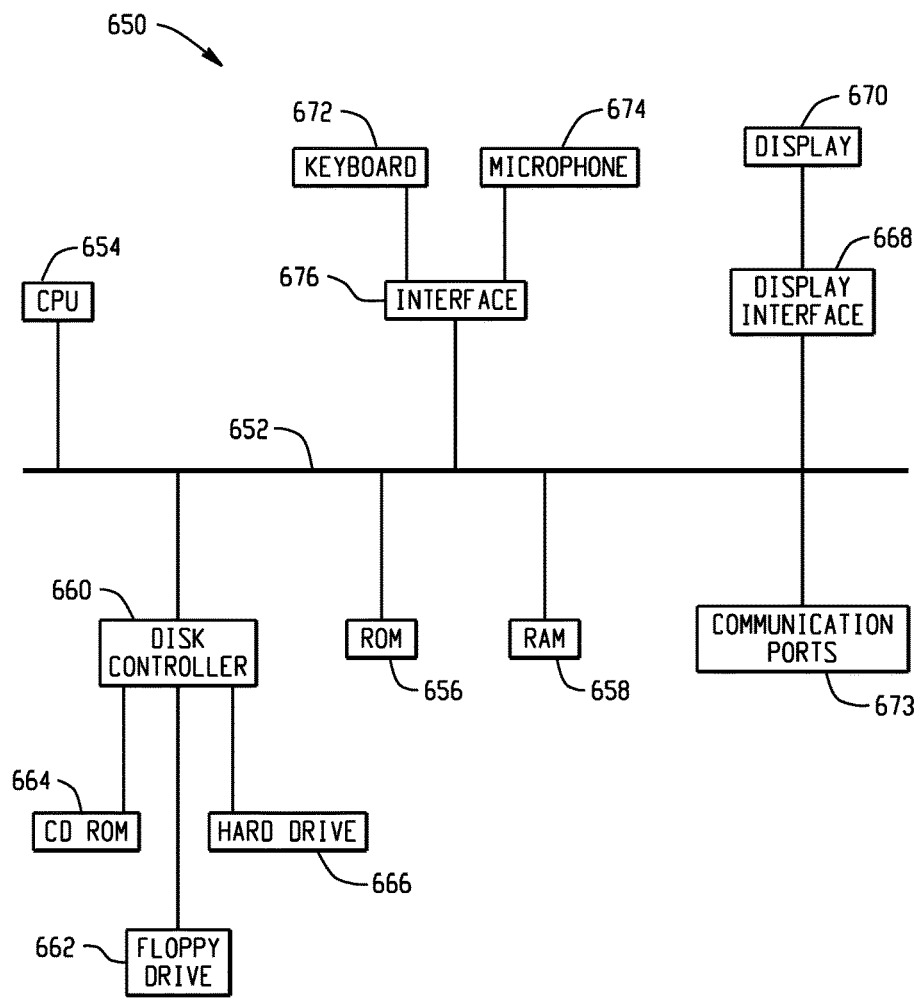

Examples have been used to describe the invention herein, and the scope of the invention may include other examples. FIGS. 7A, 7B, and 7C depict example systems for use in implementing a presentation evaluation engine. For example, FIG. 7A depicts an exemplary system 600 that includes a standalone computer architecture where a processing system 602 (e.g., one or more computer processors located in a given computer or in multiple computers that may be separate and distinct from one another) includes a presentation evaluation engine 604 being executed on it. The processing system 602 has access to a computer-readable memory 606 in addition to one or more data stores 608. The one or more data stores 608 may include non-verbal and audio features 610 as well as presentation scores 612.

FIG. 7B depicts a system 620 that includes a client server architecture. One or more user PCs 622 access one or more servers 624 running a presentation evaluation engine 626 on a processing system 627 via one or more networks 628. The one or more servers 624 may access a computer readable memory 630 as well as one or more data stores 632. The one or more data stores 632 may contain non-verbal and audio features 634 as well as presentation scores 636.

FIG. 7C shows a block diagram of exemplary hardware for a standalone computer architecture 650, such as the architecture depicted in FIG. 7A that may be used to contain and/or implement the program instructions of system embodiments of the present invention. A bus 652 may serve as the information highway interconnecting the other illustrated components of the hardware. A processing system 654 labeled CPU (central processing unit) (e.g., one or more computer processors at a given computer or at multiple computers), may perform calculations and logic operations required to execute a program. A non-transitory processor-readable storage medium, such as read only memory (ROM) 656 and random access memory (RAM) 658, may be in communication with the processing system 654 and may contain one or more programming instructions for performing the method of implementing a presentation evaluation engine. Optionally, program instructions may be stored on a non-transitory computer readable storage medium such as a magnetic disk, optical disk, recordable memory device, flash memory, or other physical storage medium.

A disk controller 660 interfaces one or more optional disk drives to the system bus 652. These disk drives may be external or internal floppy disk drives such as 662, external or internal CD-ROM, CD-R, CD-RW or DVD drives such as 664, or external or internal hard drives 666. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 660, the ROM 656 and/or the RAM 658. Preferably, the processor 654 may access each component as required.

A display interface 668 may permit information from the bus 652 to be displayed on a display 670 in audio, graphic, or alphanumeric format. Communication with external devices may optionally occur using various communication ports 673.

In addition to the standard computer-type components, the hardware may also include data input devices, such as a keyboard 672, or other input device 674, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of evaluating a performance, the method comprising:
    detecting motion of a user in a performance by the user using a motion capture device;
    processing data collected by the motion capture device comprising a sequence of frames of video imagery with a processing system to identify occurrences of first and second types of actions by the user;
    processing the data collected by the motion capture device with the processing system to determine values comprising numbers of frames indicative of amounts of time between the occurrences, the determining of a value indicative of the amount of time between first and second occurrences including determining a number of frames between a first frame and a second frame of the sequence of frames, wherein the first occurrence occurs in the first frame and the second occurrence occurs in the second frame;
    determining a non-verbal feature of the performance based on the identified occurrences and the values, the determining of the non-verbal feature including determining, for a number of frames $\tau$, a count of a number of times that an occurrence of the first type of action followed an occurrence of the second type of action, with the occurrences being separated by the number of frames $\tau$, and a count of a number of times that an occurrence of the second type of action followed an occurrence of the first type of action, with the occurrences being separated by the number of frames $\tau$, the non-verbal feature being based on the counts; and
    generating a score for the performance using the processing system by applying a computer scoring model to the non-verbal feature.

2. The computer-implemented method of claim 1, wherein the performance is an interview or a presentation.

3. The computer-implemented method of claim 1, further comprising:
    using an automatic clustering algorithm to automatically determine K types of actions, K being greater than two, wherein the first and second types of actions are from the K types of actions.

4. The computer-implemented method of claim 1, wherein the determining of the non-verbal feature comprises determining, for the number of frames $\tau$:
    a count of a number of times that an occurrence of the first type of action followed a different occurrence of the first type of action, with the occurrences occurring $\tau$ frames apart; and
    a count of a number of times that an occurrence of the second type of action followed a different occurrence of the second type of action, with the occurrences occurring $\tau$ frames apart.

5. The computer-implemented method of claim 1, wherein the motion capture device comprises a three-dimensional depth measurement device or a marker-based motion detection device.

6. The computer-implemented method of claim 1, wherein the processing of the data to identify the occurrences comprises:
    processing the data to determine a gesture made by the user during the performance;
    processing the data to determine a posture of the user during the performance;
    processing the data to determine a facial expression of the user during the performance; or
    processing the data to determine a direction of the user's eye gaze.

7. The computer-implemented method of claim 1, further comprising:
    capturing audio of the user in the performance using an audio recording device; and
    extracting an audio feature of the performance based on data collected by the audio recording device, wherein the score is generated by applying the computer scoring model to the audio feature.

8. The computer-implemented method of claim 1, wherein the computer scoring model comprises multiple weighted variables determined by training the scoring model relative to a plurality of training data.

9. A computer-implemented system for evaluating a performance, the system comprising:
    a motion capture device configured to detect motion of a user in a performance by the user; and
    a processing system configured to:
        process data collected by the motion capture device comprising a sequence of frames of video imagery to identify occurrences of first and second types of actions by the user,
        process the data collected by the motion capture device to determine values comprising numbers of frames indicative of amounts of time between the occurrences, the determining of a value indicative of the amount of time between first and second occurrences including determining a number of frames between a first frame and a second frame of the sequence of frames, wherein the first occurrence occurs in the first frame and the second occurrence occurs in the second frame,
        determine a non-verbal feature of the performance based on the identified occurrences and the values, the determining of the non-verbal feature including determining, for a number of frames $\tau$, a count of a number of times that an occurrence of the first type of action followed an occurrence of the second type of action, with the occurrences being separated by the number of frames $\tau$, and a count of a number of times that an occurrence of the second type of action followed an occurrence of the first type of action, with the occurrences being separated by the number of frames $\tau$, the non-verbal feature being based on the counts, and
        generate a score for the performance by applying a computer scoring model to the non-verbal feature.

10. The computer-implemented system of claim 9, wherein the performance is an interview or a presentation.

11. The computer-implemented system of claim 9, wherein the processing system is configured to use an automatic clustering algorithm to automatically determine K types of actions, K being greater than two, wherein the first and second types of actions are from the K types of actions.

12. The computer-implemented system of claim 9, wherein in the determining of the non-verbal feature, the processing system is configured to determine, for a number of frames $\tau$:
    a count of a number of times that an occurrence of the first type of action followed a different occurrence of the first type of action, with the occurrences occurring $\tau$ frames apart; and a count of a number of times that an occurrence of the second type of action followed a different occurrence of the second type of action, with the occurrences occurring τ frames apart.

13. The computer-implemented system of claim 9, wherein the motion capture device comprises a three-dimensional depth measurement device or a marker-based motion detection device.

14. The computer-implemented system of claim 9, wherein in the processing of the data to identify the occurrences, the processing system is configured to:
   process the data to determine a gesture made by the user during the performance;
   process the data to determine a posture of the user during the performance;
   process the data to determine a facial expression of the user during the performance; or
   process the data to determine a direction of the user's eye gaze.

15. The computer-implemented system of claim 9, further comprising:
   an audio recording device configured to capture audio of the user in the performance, wherein the processing system is configured to extract an audio feature of the performance based on data collected by the audio recording device, the score being generated by applying the computer scoring model to the audio feature.

16. The computer-implemented system of claim 9, wherein the computer scoring model comprises multiple weighted variables determined by training the scoring model relative to a plurality of training data.

17. A non-transitory computer-readable storage medium for evaluating a performance, the computer-readable storage medium comprising computer executable instructions which, when executed, cause a processing system to execute steps including:
   processing data collected by a motion capture device comprising a sequence of frames of video imagery to identify occurrences of first and second types of actions by a user, the motion capture device being configured to detect motion of the user in a performance by the user;
   processing the data collected by the motion capture device to determine values comprising numbers of frames indicative of amounts of time between the occurrences, the determining of a value indicative of the amount of time between first and second occurrences including determining a number of frames between a first frame and a second frame of the sequence of frames, wherein the first occurrence occurs in the first frame and the second occurrence occurs in the second frame;
   determining a non-verbal feature of the performance based on the identified occurrences and the values, the determining of the non-verbal feature including determining, for a number of frames τ, a count of a number of times that an occurrence of the first type of action followed an occurrence of the second type of action, with the occurrences being separated by the number of frames τ, and a count of a number of times that an occurrence of the second type of action followed an occurrence of the first type of action, with the occurrences being separated by the number of frames τ, the non-verbal feature being based on the counts; and
   generating a score for the performance by applying a computer scoring model to the non-verbal feature.

* * * * *